US007222150B1

(12) United States Patent
Phillips et al.

(10) Patent No.: US 7,222,150 B1
(45) Date of Patent: May 22, 2007

(54) NETWORK SERVER CARD AND METHOD FOR HANDLING REQUESTS RECEIVED VIA A NETWORK INTERFACE

(75) Inventors: Robert C. Phillips, Northbrook, IL (US); Caitlin B. Bestler, Lisle, IL (US)

(73) Assignee: Ikadega, Inc.

( * ) Notice: Subject to any disclaimer, the term of this patent is extended or adjusted under 35 U.S.C. 154(b) by 1310 days.

(21) Appl. No.: 09/638,774

(22) Filed: Aug. 15, 2000

(51) Int. Cl.
*G06F 15/16* (2006.01)
*G06F 9/46* (2006.01)

(52) U.S. Cl. ...................... 709/202; 718/104
(58) Field of Classification Search ............... 709/102, 709/201–203, 219, 226–232; 718/101–105; 711/173
See application file for complete search history.

(56) References Cited

U.S. PATENT DOCUMENTS

| | | | |
|---|---|---|---|
| 4,982,187 A | | 1/1991 | Goldstein et al. |
| 5,546,558 A | * | 8/1996 | Jacobson et al. ........... 711/114 |
| 5,675,738 A | | 10/1997 | Suzuki et al. |
| 5,867,706 A | * | 2/1999 | Martin et al. ............... 709/105 |
| 5,887,170 A | | 3/1999 | Ansberry et al. |
| 5,978,577 A | * | 11/1999 | Rierden et al. ............... 707/10 |
| 6,173,329 B1 | | 1/2001 | Sasaki et al. |
| 6,223,205 B1 | * | 4/2001 | Harchol-Balter et al. ... 709/105 |
| 6,304,967 B1 | * | 10/2001 | Braddy ....................... 713/150 |
| 6,374,296 B1 | * | 4/2002 | Lim et al. ................... 709/225 |
| 6,425,059 B1 | * | 7/2002 | Basham et al. ............. 711/153 |
| 6,484,186 B1 | * | 11/2002 | Rungta ....................... 707/203 |
| 6,539,494 B1 | * | 3/2003 | Abramson et al. ............ 714/4 |
| 6,615,231 B1 | * | 9/2003 | Deen et al. ................. 709/201 |

OTHER PUBLICATIONS

International Search Report in corresponding PCT Application No. PCT/US01/25346, dated Dec. 5, 2001.

* cited by examiner

*Primary Examiner*—Saleh Najjar
*Assistant Examiner*—David Lazaro
(74) *Attorney, Agent, or Firm*—Leydig, Voit & Mayer, Ltd (57) ABSTRACT

A distributed multiprocessor server system and a set of steps performed by the server system are disclosed that facilitate efficient handling of a potentially large workload arising from request messages received from users via a communicatively coupled network link. Workload requests are initially received by a default processor. The default processor redirects at least a portion of the workload request, based upon the type of request, to a specialized processor in a set of special purpose handle processors. Once delegated by a default processor, the request (or a portion thereof) is completed by the specialized handler processor to which the request was delegated. Communications thereafter proceed between the handler processor and a network interface without passing through the default processor.

24 Claims, 4 Drawing Sheets

FIG. 1

| Creator's bit | Deleter's bit | Meaning of Sector Contents |
|---|---|---|
| 0 | 0 | Void- May be written to. |
| 1 | 0 | Valid- May be read or deleted. |
| 1 | 1 | Void- May be written. |
| 0 | 1 | Valid- May be read or deleted. |
| 0 | 0 | Void- May be written to. |

NETWORK SERVER CARD AND METHOD FOR HANDLING REQUESTS RECEIVED VIA A NETWORK INTERFACE

FIELD OF THE INVENTION

The present invention generally relates to the field of server systems for handling requests from multiple users in a network environment. More particularly, the present invention concerns apparatuses and methods for efficiently providing specialized services to requesters in a network environment through request distribution.

BACKGROUND OF THE INVENTION

As the Internet has expanded, so too has the potential number of users that may simultaneously seek access to a particular Internet resource (e.g., Web site). Thus, operators of Internet sites are well advised to arrange their systems in a manner such that the current and future expanded versions of the system hardware relied upon to deliver site resources to users are capable of responding to a potentially high volume of user requests.

As the population of web users has grown, the number of concurrent clients that a single web server must support has similarly grown. It is now routine for a "single site" to have peak load access demands far exceeding the capacity of a single server. Users of such a site desire the illusion of accessing a single server that has consistent information about each user's past transactions. Furthermore, every distinct user should access the apparent single server using a same name. The challenge is to distribute processing load such that users are unaffected by any undesirable side-effects of distributing the load.

Web servers today are faced with increasing demand to provide audio/video materials, such as MP3 and Quicktime files. Such files are considerably larger than simple web pages. The combination of more users demanding larger files presents a potentially overwhelming demand for vastly increased data volume handling capabilities in web servers. More servers are needed to handle the increasing data retrieval and transmission workload.

Solutions have been implemented that share a common goal of dividing the workload of the single virtual server over many actual servers. It is desired that the workload of responding to multiple user requests be divided in a transparent manner so that the division is not visible to the customer. However, load balancing mechanisms have limited or no knowledge with regard to the context or prior history of the messages they are trying to distribute. Existing solutions have chosen between overly restricting the requests that can be processed by particular servers, thereby limiting the ability to evenly balance the traffic load. In other instances work is divided between servers operating in ignorance of each other.

There are at least four known approaches for dealing with the aforementioned problems encountered as a result of high user load. The oldest is server mirroring that involves replicating content across multiple sites. Users are encouraged to select a specific server that is closest geographically to them. Because the load distribution is voluntary it is not very efficient. Synchronizing the content of all servers across all sites is problematic and time consuming. Generally this approach is considered suitable only for non-commercial information distribution.

Second, distributed naming service (DNS) load balancing distributes work across multiple machines at the time that clients request a name to an Internet Protocol (IP) address. Such distributed processing methods are inexact due to remote caching. Furthermore, problems arise with regard to ensuring that related requests from the same client issued at different times result in a connection to the same server. Traffic to the DNS server is increased because DNS queries are increased. This second approach demonstrates that merely duplicating hardware will not meet a need for additional throughput in a server resource/system. Additionally, because later queries from the same user could easily go to a different server, all work must be recorded on shared storage devices. Such additional storage devices could be additional database or file servers, or devices on a storage area network.

Third, OSI layer 3 (network) and layer 4 (transport) switching solutions distribute connections across multiple servers having equal capabilities (though possibly differing load handling capacity). Entire sessions are distributed to a particular server regardless of the type of request. Because a layer 3 or 4 switch is not an actual participant in any of the protocol sessions going through it, and because it is of a simpler and more specialized design than the actual servers, it cannot fully understand the protocols that it implements. It cannot with full certainty understand the types of requests it sees. Though limited examination of packet contents may occur, the majority of such switches do not examine the content of packets that pass through them.

An FTP (File Transfer Protocol) file transfer is one example where limited examination may occur. Some layer 3 switches are configured with enough knowledge of the FTP protocol to recognize the description of a second connection buried within the payload of a packet transferred via a first connection. Others merely assume that all connections between a pair of IP addresses are for the same user. The former approach requires the switch to stay current with all new application protocols, and cannot work with encrypted payloads. The latter presents the problem of requiring all users working behind a single firewall using Port Network Address Translation (PNAT), or masquerading, to be considered as a single user. Given that the goal of load balancing is to evenly distribute the workload, unpredictability in how much work is being committed to a single server with a given dispatch presents a problem. This example illustrates the deficiencies in the prior known systems that are limited to switching functionality rather than delegating execution of requests for resources to specialized processors/processes.

Once a session is initiated it is assigned to a particular server based on very little context information. Typically the context information includes only the addressing information within the initial packet itself without the benefit of knowing the substance of any queries to customer databases or other records. In particular it is not practical for the switch to distinguish between a single user and an entire building of users sharing a single IP address. Thus, an initial assignment may be supplemented only by limited analysis of later packets to identify packets belonging to the same session. This distribution scheme is carried out by a switch having very limited analytical capabilities.

Other prior load distribution solutions conduct only a limited analysis to determine the type of a request received by the server system after a session is initiated and assigned to a particular server. Furthermore, providing a set of equally capable servers is a potentially expensive solution that is likely considered too expensive for many potential Internet service providers. The sharing of results through direct back channel communications or sharing of database, file or storage servers is still required for these solutions.

In a fourth known attempt to distribute requests for resources over distributed network servers, server clusters distribute work internally over an internal communications bus that is typically a switched access bus. Communications to the external network interface are performed via a single centralized server. Thus, while distributing the computational load, the third known option introduces a potential communications bottleneck at the centralized communication server.

The first three solutions divide a single virtual server's workload into multiple user sessions. Such prior known solutions attempt to ensure that all traffic for a given user session is handled by a single actual server while attempting to distribute the work load evenly over the entire set of actual servers. These goals are incompatible in the prior known systems. Mirroring, because it relies upon the user identifying the targeted server, is excellent at ensuring only one actual server deals with a given user, but the only mechanism for balancing load between the servers is the process of users shifting between servers out of frustration. Layer 3 switch solutions achieve load balancing, but at the cost of failing to identify all parts of a single user's interaction with the server. The fourth solution avoids these problems by having a single server delegate work, but limits the scope of this optimization by remaining a single communications bottleneck.

Thus, while a number of solutions have been implemented to deal with the problem of explosive growth in the popularity and volume of use of the Internet and the resident Web sites, none provide a solution to the increased cost and overhead associated with distributing user workload addressed to a single apparent resource that is, in actuality, distributed across multiple processors.

With regard to organization of files on storage partitions. Traditional solutions involve complex multi-layer directories. Unix file systems are an example of such structures. The storage partition has a root directory providing descriptions of the files stored within the partition. Some of these files are themselves directories. The above described nested directory structure can be repeated indefinitely. In such directory arrangements the filename "/a/b/c.d" is interpreted as follows: read the root directory to find the directory file named "a", read that file to find the directory file named "b", and finally read that to find the location of the file "c.d".

These directories may contain far more information than just the file location and size. Access permissions, last update time, creation time, access time and file type are also encoded. Some files may be links to other files. Unix file systems refer to these as symbolic links, in Windows they are referred to as shortcuts and in MacOS they are known as aliases.

The web daemons that process internet requests, such as those for a URL (Universal Resource Locator) typically follow complex rules for mapping requests into an actual file name. For example the Apache web server, is usually configured to map the URL "http://www.ikadega.com/~George/myFile/" to the file "/home/George/public_html/myFile/index.html". But that mapping can be altered depending on options placed in other files. So to fulfill an HTTP "get" request the server must make several file open requests of the operating system, each of these requests will in turn require accessing multiple directories. Only then can the real content be read, quite possibly from non-contiguous sectors on the disk.

SUMMARY OF THE INVENTION

The present invention comprises a distributed multiprocessor server system, and a set of steps performed by the server system, that efficiently handles a potentially large workload arising from request messages received from users via a communicatively coupled network link by delegating the workload to a set of special purpose handler processors. Once delegated by a default processor, the request is completed by an handler processor to which the request was delegated. Communications thereafter proceed between the handler processor and a network interface without passing through the default processor.

The server system of the present invention thus includes a network interface that facilitates communication between the multiprocessor system and a connected network. The network interface is coupled to an intelligent switch. The switch comprises logic components for identifying a new request received via the network interface in the form of a message packet and passed from the network interface to the intelligent switch.

The server system embodying the present invention further comprises a default handler processor coupled to the intelligent switch. The default handler is programmed to: receive the new request from the intelligent switch, associate a request type with the new request, identify a handler processor from a set of specialized handler processors for executing the new request based upon the request type, and issue a message reassigning the new request to the identified handler processor. The identification and delegation steps need not be done based on the initial request packet, nor do they need to delegate the entire interaction until completion. The default handler may delegate work at any point during the interaction, and for any specified portion of it.

The system incorporating the present invention further includes an internal bus structure communicatively linking the set of specialized handler processors to the intelligent switch and request reassignment tracking logic enabling the intelligent switch to route received messages associated with the reassigned request to the identified handler processor. This arrangement facilitates direct communications between the set of specialized handler processors and the network interface via the intelligent switch after a request has been reassigned from the default processor to one of the specialized handler processors.

In accordance with an aspect of an embodiment of the present invention supplements the benefits of load delegation with new methods of organizing the contents of disk partitions holding material for retrieval by web daemons. Each URL is directly translated to storage location when the web site is published, and then looked up with at most a single disk read before being ready to retrieve the actual content.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF AN ILLUSTRATIVE EMBODIMENT

A new wide area network server architecture is described below in the form of a preferred embodiment and variations thereof. At the heart of this new network server architecture is a hybrid-multiprocessor wide area network (WAN) server card. The hybrid-multiprocessor WAN server card includes at least one default handler processor accessed over a switching fabric (also referred to herein as "fabric") that is preferably an ATM switching fabric. The WAN is, by way of preferred example, the Internet. Thus, communication between the WAN card and an external network is preferably conducted in accordance with the Internet Protocol (IP). When a user requests to initiate a session with the WAN server, the session request is received by a WAN interface and passed via a WAN/fabric packet switch to the default handler processor. The WAN/fabric packet switch routes packets between the WAN interfaces using, by way of example IP addressing, and a different switching fabric format used within the server system such as ATM or Fibre Channel. The default handler processor initially processes the session request, including filtering an improper request. If appropriate, the default handler processor delegates the remainder of the session to one of a set of specialized handler processors. In fact, it is contemplated that the default handler will rarely process actual commands for transferring assets. Rather, the commands will be fulfilled under the control of one of the processors to which the session is delegated by the default handler processor.

As mentioned above, the WAN server card of the present invention also includes a set of one or more specialized handler processors that are configured to accept requests delegated by the default handler processor to the set of specialized handler processors. An example of a specialized handler is one specifically configured to control delivery of a html file according to the HTTP delivery protocol using TCP/IP.

A WAN/fabric packet switch is interposed between, and configurably links, the various components of the WAN server card, including the WAN interface and the handler processors to one another. The switch connects via industry standard buses, such as PCI (peripheral contact interconnect), to an external processor, such as a Pentium, running off-the-shelf application software. To avoid the need to install special device drivers, the Network Processor may offer the appearance of standard Ethernet NIC and/or IDE Controller over the industry standard bus. Thus, the present invention, in a particular embodiment is extensible to incorporate off-the-shelf pre-existing internet application server applications in addition to applications written or ported to the WAN Server card environment. Alternatively, the external processor may simply have device drivers installed to allow communication of packets over the industry standard bus.

As with conventional Layer 3 or 4 switches, the WAN/fabric packet switch identifies connections and passes traffic through those connections, optionally translating between the WAN packet conventions (e.g., IP) and the switching fabric packet conventions (e.g., ATM or other cell-based switching protocols). Thus the switch has a table listing the identifying header information for each circuit in either format.

In the preferred implementation the WAN/fabric packet switch applies only connection identification rules because the default processor delegates only simple portions of the protocols. Thus in an IP/ATM implementation, the WAN/fabric packet switch utilizes the following information to identify each connection: WAN IP Address, WAN IP Port, Server IP Address, Server IP Port and the ATM Virtual Path (VPI) and Virtual Circuit (VCI).

One connection from the WAN/fabric switch leads via an interface to a fabric switch providing communication paths between one or more storage servers (comprising multiple storage media devices such as hard drives) and the processors within or connected via the WAN server card. The WAN/fabric packet switch also support peer-to-peer communications between WAN server cards. In the preferred implementation the switch is of the type generally disclosed in U.S. application Ser. No. 09/579,574, filed on May 26, 2000, and entitled: "Information Distribution System and Method" which is explicitly incorporated herein by reference. However the invention disclosed here is fully compatible with other storage area networks, including Fibre Channel, and forthcoming "system area networks" such as INFINIBAND and RAPIDIO system area networks.

The architecture of a WAN server system including the above-described hybrid-multiprocessor card is extensible, and thus multiple hybrid-multiprocessor WAN server cards having the above general arrangement are integrated to provide access to a shared data resource connected via a switching fabric. Each of the WAN server cards includes its own WAN interface. In the case of an Internet connection, each WAN server card is assigned a unique Internet address. The invention is not limited to an Internet environment and may be incorporated into virtually any type of server environment including intranet, local area network, and hybrid combinations of various network interfaces to the WAN server cards. Thus, while generally referred to herein as a WAN server card, the architecture is applicable to network configurations that include LAN interfaces.

The present invention is not intended to be limited to a particular arrangement of distributed handler hardware on a WAN server card. The "server card" may take any of many different forms. While preferably the default and specialized handler processors are arranged upon a single, multi-layer printed circuit board, the card may in fact be a set of cards connected via a high speed data/control bus.

Figure 1:
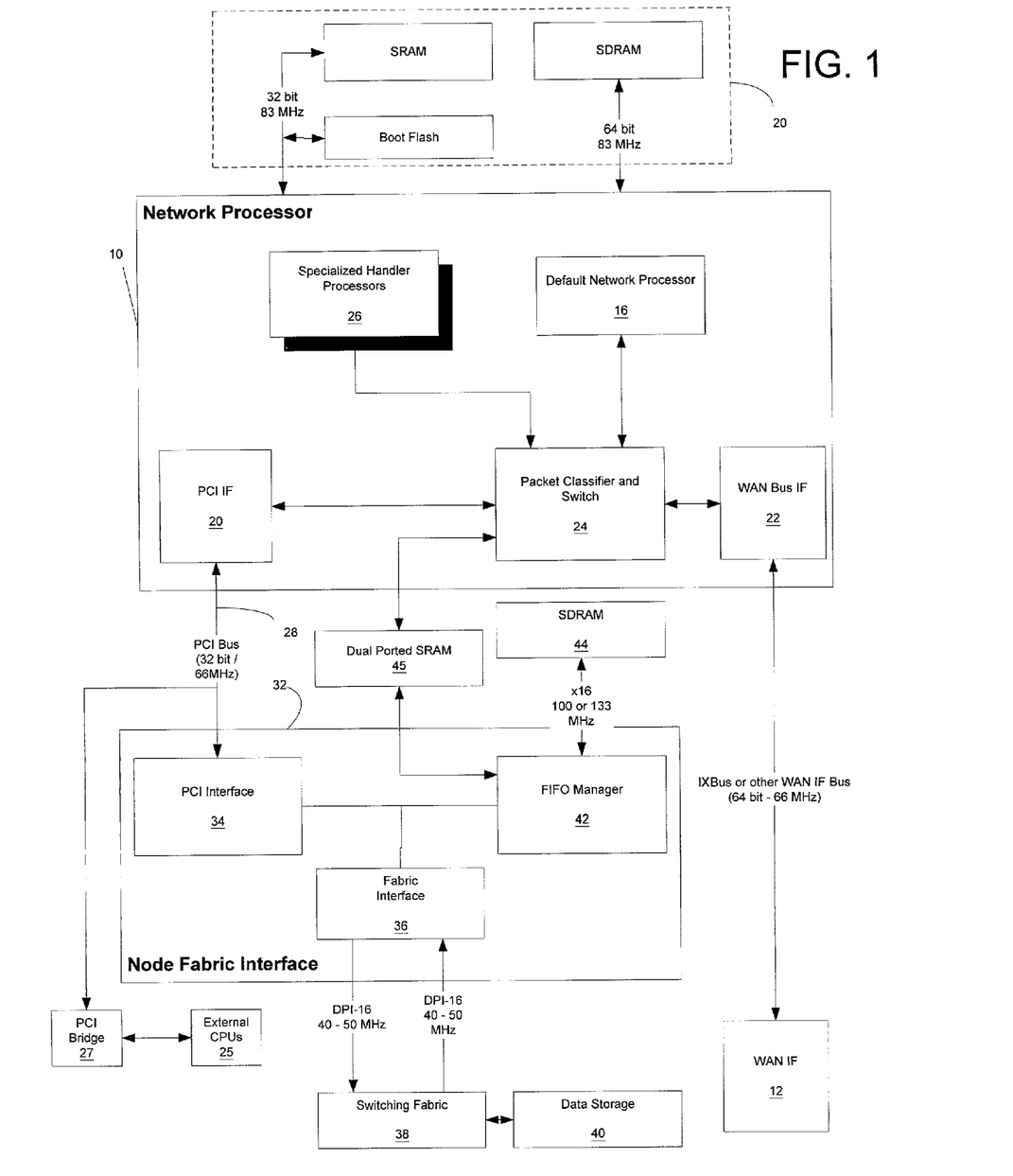
FIG. 1 is a high level hardware block diagram identifying primary components of a server system embodying the present invention.

Having generally described an embodiment of the invention and exemplary alternatives, attention is now directed to FIG. 1, a high level block diagram schematically depicting primary components in a server system embodying the present invention. The switched, hybrid-multiprocessor architecture of the present invention is believed to be particularly well-suited for providing Internet oriented services, especially those involving streaming video or other real-time extended data delivery systems. A hybrid-multiprocessor network processor 10 is replicated multiple times in a server system depicted in FIG. 1. Each instance of the network processor 10 supports an application node and one or more internet protocol addresses accessed via a WAN interface 12. The network processor 10 features parallel processing that is optimized to handle packets at "wire speed." Thus, the network processor 10 typically handles requests on a FIFO basis. The network processor 10 is preferably used for high speed serial processing rather than complex calculations.

The WAN interface 12 is provided by off-the-shelf interfaces. For example, each replicated instance of the network processor 10 supports external communications via multiple (e.g., octal) 100 Mb Ethernet ports. As such, to the outside world, the servers accessed via the interface 12 resemble known "web farm" installations comprising an array of servers interfaced to the outside world and access shared data storage on an internal network. In alternative embodiments, the WAN interface 12 comprises, for example, a dual 1.0 Gb Ethernet, OC-12, or one of the newly emerging "system area network" interfaces. This interface is flexible and facilitates interfacing to existing public networks via any deployed interfaces. The arrangement in FIG. 1 enables utilizing existing server software. However, a unique multiprocessor arrangement and configurable switched paths between multiple processors and a data storage server (not shown) more efficiently utilize the resources of the web server system within which the network 10 is incorporated.

An important aspect of the present network processor 10 architecture is the facilitation of specialized service load delegation. In the illustrative embodiment, a server load is delegated from a default handler to multiple, special purpose processors. Thus, the network processor 10 includes at least one default network processor 16. The processor 16 provides standard services that are typically implemented on rackmount services for ISPs. The default network processor 16 comprises a 32-bit reduced instruction set computer (RISC) core that serves as the master coordinator of all services provided to clients. It is the software executing here that has the authority to delegate work to specialized handler processors. The default network processor 16 has access to random access memory 20 (SDRAM, SRAM and boot flash).

When a user initiates a session with the network processor 10, an IP request packet is received by the WAN interface 12 and passed to a WAN Bus IF 22. The WAN Bus IF 22 is, by way of example, an IXBus interface that sends/receives IP packets encapsulated in Ethernet or ATM. The WAN Bus IF 22 passes the received WAN (typically IP) packet to a packet classifier and switch 24. The packet classifier and switch 24 is just one of a set of microengines on the network processor 10. The remaining microengines are described herein below. The packet classifier and switch 24 routes received packets based upon a specified connection identified the received packet. When this target uses a switching fabric interface, the WAN packet is tunneled within a fabric packet. In the preferred embodiment this entails simple tunneling IP packets inside fabric packets. Packets that are not part of a previously existing connection are routed to the default network processor 16. The default network processor 16, in a preferred embodiment of the invention, is a processor core that is part of the same device as the packet classifier and switch 24.

The default network processor 16 initially processes a session request packet, including filtering any improper request packet. The default network processor 16 includes extended functionality facilitating delegating the connection, optionally including the current packet, to a next set of microengines referred to herein as specialized (e.g., protocol sub-state) handler processors 26 (described herein below). If the default network processor 16 decides to delegate a request, the default network processor 16 instructs the packet classifier and switch 24 to route further requests for the identified connection/session to a designated one of a set of specialized handler processors 26. The default network processor 16 will also pass startup instructions using the device's internal messaging capabilities to the designated one of the set of specialized handler processors 26, typically including the packet that prompted the delegation.

In the context of the present invention, a request is not limited to a single query from a user. Rather, a request may comprise multiple related queries from a user, preferably including a same identified connection between a user and server. Thus, in a preferred embodiment of the invention, delegation in the context of a request is sustained for one or more logically related client queries for assets where the client's packets match those expected by the designated handler server. For example, when a file is transmitted from the server to a client under any of the well known transfer protocols such as HTTP, POP3, and NNTP the server expects only transmission control protocol (TCP) acknowledgement (ACK) packets from the client.

Any unexpected packets are handled by the default network processor 16. Recognition of unexpected packets is performed in an embodiment of the invention by the specialized handler to which the connection has been delegated by the default network processor 16. When a designated specialized handler processor of the specialized handler processors 26 is handed a packet, or otherwise detects a condition, it cannot handle, it reverts control to the default network processor 16. However, in alternative embodiments the packet classifier and switch 24 recognizes the expected packets using rudimentary logic, and reverts the connection to the default network processor 16 without instruction to do so by any specialized handler of the specialized processors 26 to which the connection was previously delegated.

The preferred location of the recognition logic is ultimately determined in accordance with a number of factors including a cost tradeoff determined by the actual parts chosen for a specific implementation. At a minimum the packet classifier and switch 24 accepts connection re-routing directives from the default network processor 16, and reverts a delegated connection back to the default processor upon receiving such a direction from a specialized handler. The WAN/fabric packet switch 22 may also be configured to automatically revert a connection back to the default processor without instruction by a specialized handler on certain easily recognized conditions. Thus, it is contemplated in embodiments of the present invention, the direction to revert a connection may be self-instructed by the packet classifier and switch 24 in some circumstances. While in other instances, the direction to revert a connection comes from one of the set of specialized handler processors 26 to which a connection was previously delegated.

In addition to the capability to delegate work to the internal specialized handler, the packet classifier and switch 26 can support delegation to external processors 25 accessed via a PCI bus 28. Any given processor can function as though it were several micro-engines with similar options. Of course external processors will have greater flexibility and execution power, but with slower access to the network processor and greater cost.

As mentioned above, the network processor server card of the present invention includes the specialized handler processors 26 configured to respond to requests delegated by the default network processor 16. In a preferred embodiment, the specialized handler processors are designed to process packets at "wire speed." The specialized handlers send and receive packets to/from other components of the network server depicted in FIG. 1. The specialized handlers include, by way of example, simple logic blocks having minimal code space and needing very minimal access to shared random access memory.

In the preferred implementation each specialized processor of the set of specialized handler processors has private memory sufficient for storing the in-transit packets and minimal additional working storage. Thus, memory accesses by the specialized handler processors 26 have minimal interference with access by the default network processor 16 to random access memory 20. Furthermore, the specialized handler processors 26 relieve the default network processor 16 of the need to use it's own memory, avoiding a critical bottleneck associated with traditional server architectures. The types of special purpose processors in the set of specialized handler processors 26 is without limit. Examples of functions performed by the specialized handler processors 26 include TCP named file transfers over an identified connection via HTTP, FTP, SMTP, POP3, and NNTP. Another example is transmitting a file under a UDP protocol such as RTSP. Yet other processes include accepting a file via TCP; encrypting a file prior to transfer; compressing/decompressing a file; watermarking an image or audio file during transmission; server-side includes; and CGI routines requiring minimal access to shared resources beyond simple file retrieval. As mentioned earlier, the list of delegated functions by specialized handlers is extensible to support any of a wide variety of specialized tasks completed after a connection is delegated to a particular specialized processor by the default network processor 16.

The default network processor 16 also delegates requests to external handler processor(s) 25 via a PCI bridge 27 connected to a PCI bus 28. External handler processors 25 typically run off-the-shelf application software comprises, by way of example, a PENTIUM III (Trademark of Intel Corp.) processor or similar advanced processor. These external handlers may be present on the same card as the network processor and/or accessed via a Compact PCI (CPCI) backplane or even the cell based switch fabric. In the preferred implementation one such processor is available on the same board, others are optionally available via CPCI backplane or the switch fabric. Thus, the present invention, in a particular embodiment is extensible to incorporate standard internet application server applications in addition to the custom applications executed by the specialized handlers. The PCI bus 28 is connected to a PCI interface 30. The PCI interface 30 receives packets from the packet classifier and switch 24. The packet classifier and switch 24 utilizes the PCI interface 30 to make DMA reads and writes over the PCI bus 28.

In addition to the PCI bridge 27, the PCI bus 28 is connected to a node fabric interface 32 to facilitate transfers between the network processor 10 and assets accessed via the node fabric interface 32 and switch fabric 38 such as a large data storage facility 40. The node fabric interface 32 comprises a PCI interface 34 that provides cell forwarding and sector FIFO retrieving services as a DMA slave over the PCI bus 28. The DMA master may: read N sectors from a given FIFO, read the control information for any FIFO, write a new FIFO control block, write cells to be forwarded to the Fabric, and/or read cells as they are received from the Fabric.

The commands and payload (and the responses to them) are proxied via the packet classifier and switch 24 to use the attached storage 40 server. In this fashion the boot code and operating system of any attached external processor does not have to be customized to this environment.

A fabric interface 36 of the node fabric interface 32 is connected to a switching fabric 38 via dual uni-directional DPI-16 buses (40-50 MHz). The fabric interface provides cell forwarding services between the PCI interface, and switching fabric 38 and a FIFO manager 42.

The switching fabric 38 provides a configurable communication path between a storage server (comprising multiple storage media devices such as hard drives) and the processors within or connected via the WAN server card. The switching fabric 38 is, by way of example, the type generally disclosed in U.S. application Ser. No. 09/579,574, filed on May 26, 2000, and entitled: "Information Distribution System and Method" which is explicitly incorporated herein by reference.

The FIFO Manager 42 receives packets from the switching fabric 38. Each packet is identified by an eight bit logical destination and a 16 bit logical circuit which is placed only in the first cell. A small number of these destinations are reserved for pass-thru's to DMA channels on the PCI interface 34. The remainder are used for sector FIFO buffers. The logical circuit in the first cell identifies the FIFO buffer control block that is to be used for this packet. The payload from this packet is then deposited in that FIFO buffer. The FIFO control block may reference storage locations within a DRAM 44 directly controlled by the node fabric interface 32 or DRAM that is accessible via DMA over the PCI Bus. The choice of logical circuit/FIFO Buffer control block dictates which destination is actually used. The interface controlled DRAM 44 must have more than twice the bandwidth of the fabric interface 32. The preferred implementation will use a 16 bit wide 100 MHz memory to buffer traffic from a 16 bit wide 40 MHz fabric interface. Another example is a 16 bit wide 133 MHz memory to buffer traffic from a 16 bit wide 50 MHz interface.

A dual ported SRAM 45 is interposed between the FIFO Manager 42 and packet classifier and switch 24. The SRAM 45, as shown in FIG. 1, is configured to at least receive data from the SDRAM 44 via the FIFO Manager 42 and provides the data to the packet classifier and switch 24 for transmission to a requester via the WAN IF 12. Thus, as currently depicted, the SRAM 45 supports uni-directional flow of data from the data storage 40 to a requestor via the WAN IF 12. In an alternative embodiment, the SRAM 45 is configured to support bi-directional data flow between the WAN IF 12 and the data storage 40.

The architecture of a WAN server system including the above-described hybrid-multiprocessor card is extensible, and thus multiple hybrid-multiprocessor WAN server cards having the above general arrangement are integrated to provide access to a shared data resource connected via a switching fabric. Each of the WAN server cards includes its own WAN interface. In the case of an Internet connection, each WAN server card is assigned a unique Internet address. The Invention is not limited to an Internet environment and may be incorporated into virtually any type of server environment including intranet, local area network, and hybrid combinations of various network interfaces to the WAN server cards. Thus, while generally referred to herein as a WAN server card, the architecture is applicable to network configurations that include LAN interfaces.

Finally, with regard to the WAN server of FIG. 1, the default network processor 16 and/or the packet classifier and switch 24 incorporate ISO layer 3 or higher switching protocols enabling identification of new connections. Thus, received packets requesting a new connection can be given special attention, including filtering of unwanted or unauthorized requests. By separating new connection packets from ones associated with delegated requests, the existing connections cannot be overwhelmed by attacks upon the system. For example, in accordance with one filtering method, priority is given to existing connections. New requests from previously unknown sources are treated initially at the lowest priority level thereby preventing such requests from lowering the level of service provided to previously established client connections.

An objective of a preferred embodiment of the invention is to avoid processing or data transfer bottlenecks when processing a large number of concurrent requests. Storage systems of type described in U.S. application Ser. No. 09/579,574, filed on May 26, 2000, and entitled: "Information Distribution System and Method" are designed with the same goal. However, the efforts of both of these systems could be undermined if multiple WAN servers were to contend for access to complex directory structures over the storage network.

In addition to improving the way in which large content files are transferred, the preferred embodiment of the invention seeks to improve locating specific files within the storage system as well. The preferred embodiment of the invention specifies direct accessibility of content partitions via a storage network. In a preferred environment the content partitions are relatively large. Each content partition represents a large body of content stored on consecutive storage sectors on one or more storage devices.

With other aspects of the invention reducing other bottlenecks, resolving directory names has the potential to become a new bottleneck limiting system throughput. Dividing the storage assets into content partitions allows the storage network to provide access to a vast amount of data through the use of a relatively simple flat directory structure. A directory structure is considered "flat" when it has only one layer. That is, all entries are at the top layer of the directory, there are no sub-directories. Using a flat directory avoids the need for complex arbitration of directory structures within the storage network itself.

Instead of a complex directory tree, the preferred directory accesses relatively few types of shared partitions. Further, the contents of those partitions are organized so as to allow efficient concurrent use of the partitions by multiple WAN Server cards and multiple handlers within each of the those cards.

A non-complex partition structure is used for raw streamed data, such as MPEG Transport encoded movies. The non-complex partition structure facilitates efficient delivery of large amounts of streamed data. Such qualities make an embodiment of the present invention particularly well suited for delivering movies and audio files to client systems. In a video server application the main partition format is used to hold a single program transport stream. Thus, an entire movie is stored within a single memory partition on a drive within at least one of the set of storage servers 14 connected via switch 38 to the set of WAN server cards. Where a memory drive is heavily used during typical operation, the fact that memory is allocated in the order of playback greatly reduces wear upon the physical drive as well as reduces seek times. Because a movie is a very large storage asset, there are relatively few files on a storage device containing such assets. Thus, in an embodiment of the present invention, each movie is identified in a root level entry in a substantially flat directory structure.

In accordance with another aspect of a preferred asset storage strategy, each partition is interpreted by WAN Server cards in a traditional format. In such a strategy the partitions are identified as if their contents were the contents of distinct actual hard drives. The memory on the storage 40 is presented using a known pseudo-drive format as though each is a separate hard drive. Thus, each has its own master boot record and partition table. Such an arrangement facilitates interception of instructions to an intended drive at a lower layer of the protocol stack. Such pseudo-drive partitions can only be write modifiable by a single processor at any given time. However they can be read by multiple handlers concurrently. Read-only drive formats, such as those for data CD-ROMs or DVDs can be read by multiple handlers concurrently.

Another storage strategy, involving minimal adaptation of existing software, is to arrange each content partition in an existing partition format such as FAT32, NTFS, ext2, etc. This option simplifies the process of initially creating content partitions. The partitions may be arranged by existing software on the conventional file system, and then copied to one of the content retrieval optimized formats. Thus, the update-friendly strengths of the existing conventional partition formats is used while the content is under heavy modification.

Another feature of the preferred file server system is increased speed while accessing files identified by a character string, such as an Internet URL (Universal Resource Locator). Other rules enforced by the content storage system include preventing modifications to indexed names in the partition as well as the location of the names within the partition. Traditionally, web servers have been built upon general purpose file systems. Therefore the web servers executed complex procedures to determine what disk content to access. The complex procedures were needed because the content was indexed in a manner that supports unneeded dynamic capabilities. An embodiment of the present invention supports content partitions that, once authored, are fixed in their content. Thus, a particular file name will be found at a particular location during the time in which the contents of the partition remain fixed.

Yet another trait of the memory system is the computation of a name index at the point when a partition is created and fixed (committed). This allows relatively computationally expensive operations on the file system, such as computing a well known perfect hash index of the names, to be computed before the file system goes on-line. The directories in a contemplated embodiment of the invention include a relatively small number of files. Furthermore, updates to the directory are relatively infrequent, and thus even large file directories will not seriously degrade the operation of the system. Thus, the content partition directory is arranged as a simple flat directory of URLs corresponding to various files on the storage server 14.

A single read is accomplished as follows. Initially a hash value is computed from the filename (e.g., URL) based upon per partition characteristics noted when the drive was initially identified to perform the read. Next, a sector identified by the computed hash value is read to obtain a directory entry for the file. The directory entry identifies the file's size and sector offset within the partition. The file read is then commenced by the server system. Because all copies of the content partition are identical, the actual read does not have to be issued against the same copy that the directory was read from. Nor must the directory entry be read immediately prior to the content read. The content accessor may cache as many entries as it desires to for as long as desired.

Organizing the partition in this fashion has two important benefits. First, at most one sector is read to determine the location of any file within the partition. Second, the read may be performed by any storage system access process, or by the storage system itself. Indeed, such calculations can be performed in parallel by multiple directory access processes.

Similar to the above described block relocation scheme, an exemplary file system includes a URL-based file system that supports overlaying an old and new file when a file's content/size changes. In the case of URL-based file systems, whole URL files are overlaid rather than specific blocks. A perfect hash table for the set of copied files is not created until the final file commit for the last copied file. A temporary index is created during the file transfers to support the copying of files during the update operation.

In a file system server installation where file updates are more common, yet on a serialized basis in view of the packed nature of the preferred memory organization, a messaging system is incorporated to indicate the present status of a particular file. The messaging system supports appending messages to various target files without disrupting existing files. Such files include: email account mailboxes, print spools, usenet groups, and log files. The messaging system imposes the following restrictions. The files are identified in the same manner as the URL-based file systems and cannot be changed easily since such changes disrupt the file structures and require costly re-calculation operations. The total capacity of the message files cannot be changed. Only a single creator may access a given message file at any time. Only a single user may access a file to delete its contents at any time. Messages, which are stored serially in a file, are preferably deleted in the order they are received.

Figure 2:
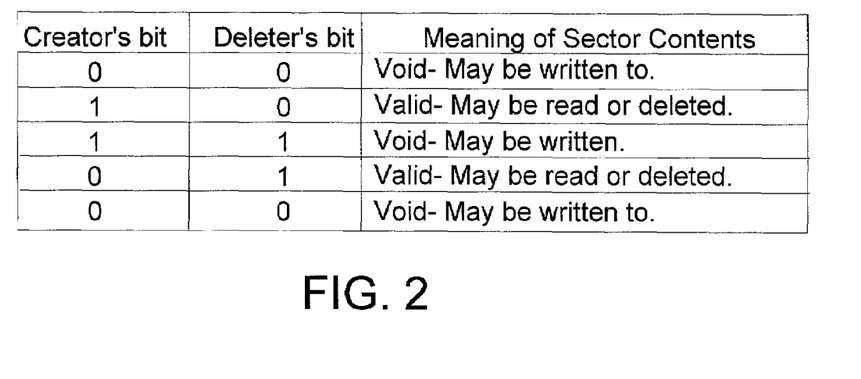
FIG. 2 is a chart depicting a set of bit map states associated with a message file system in accordance with an embodiment of the present invention.

The message files are carried out by logically segregating blocks within a message file identified by a URL. Both a creation and deletion bitmap are maintained by respective creation and deletion processes. Each bit corresponds to a sector within a message file. As shown in FIG. 2, if a bit is the same in both the creation and deletion bitmaps for a particular sector, then is contents are void and may be used to store new messages. After a new message is stored in a sector, the creator toggles the bit in the creation bitmap. After deleting a message, the corresponding deletion bit is toggled to indicate that the sector is void and may be reused. A creator marks a block at the end of a message sequence, requiring further reads to jump to the beginning of a next sector to read a next serially stored message.

A number of the methods already disclosed herein rely upon access to version controlled content partitions stored at one more locations within a storage network. An aspect to simplifying access to content partitions is that each copy is stored on consecutive sectors within the storage device. Such storage strategy, while well-known, are considered unsuitable for the frequent update needs of most file systems. In particular, contiguous allocation strategies present a challenge to collecting available free space into usable aggregates. Even with a content distribution system, this problem must be addressed. Thus, in an embodiment of the present invention, in addition to the drive, base sector and size of a given copy of a content partition, an additional value is provided that corresponds to the location of a straddle (gap) in the otherwise continuous memory allocated to the partition containing the file.

At some point in time there may arise a need to move a file on the physical disk due to additions or deletions from the drive. In an embodiment of the present invention, when a particular file is in the process of being relocated, the file remains accessible. Furthermore, copying a particular file may include copying file blocks to portions of the physical memory occupied previously by moved blocks in the copied file. In such an instance the storage 40 server tracks which portion (e.g., blocks) of the file has been written. Accesses to the written portion are executed with reference to the new file location and file offset. Accesses to the non-updated portion of the file are executed with reference to the old location. Unwritten blocks are copied when the file is committed or, in an alternative embodiment, on an opportunistic basis.

The storage 40 server and switching fabric 38, and a mode of access is described in detail in U.S. application Ser. No. 09/579,574 filed on May 26, 2000 which is explicitly incorporated herein by reference. It is noted that the application nodes (e.g., MPEG decoders for a video server) of the default network processor 16, specialized processors 26 and external handler processor (not shown) share read access to an entire set of shared storage devices of the storage 40. Because all disk data traffic passes directly over a path through the switching fabric 38 there is virtually no interference between the various application nodes. Unlike bus architectures, multiple application nodes can be receiving and/or sending payload. Further, because each portion of a streaming read could be fulfilled with a different copy of a stored asset, blocking on a particular application node is reduced (assuming replicas exist of popular assets). Central control over the storage device is maintained by a single host in the storage 40. However, the data transfers, once started in an ATM mode, are completed without intervention by either the single host or an application node that submitted the initial request message.

As mentioned previously herein above, the data storage upon the fixed memory drives within the storage 40 is preferably maintained in a packed, continuous format to minimize mechanical wear upon the fixed data storage drives of the storage 40. In order to maintain this preferred arrangement, the preferred embodiment of the invention incorporates versioned update control. More particularly, once a file is stored on a disk drive maintained by the storage 40 server, and made available for access to others, it cannot be modified. All changes must be carried out on a later-installed version of the file. Such a rule is amenable to relatively static content which may include by way of example: MPEG video, web pages, document images, audio files or archives. Other rules enforced under the version control scheme include limiting update access to a single authorized user for any particular sequence of adjacent sectors of a disk drive, and thus there is a limit on the total number of concurrent update sessions operating at any given time. The changed assets must be committed before they can be read by others.

Another feature of the data storage system including the storage 40 is the incorporation of no impact storage coalescing (packing) which involves moving open spaces in the disk drives to a contiguous set of open sectors—preferably at the end of the physical address space of the drive. No impact generally refers to the ability to read from any file while it is being relocated in accordance with a coalescing procedure. No impact storage coalescing is obtained by defining partitions to include a "straddle," or empty region, within them. The straddle is at least the size of the block of data relocated at any time during coalescing. Therefore, when a file portion is copied during coalescing, the portion is copied into the front of the straddle. After copying the file portion, the portion of the physical storage space containing the source of the copied file portion becomes the rear portion of the straddle gap. This straddle is preferably located between two contiguous regions within a single partition. Additional straddles may be located between differing partitions.

Figure 3:
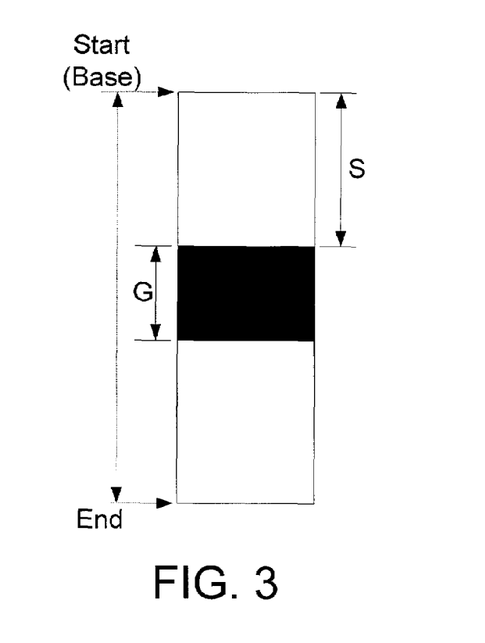
FIG. 3 is a drawing depicting memory packing in accordance with a preferred embodiment of the present invention.

In general, coalescing is intended to remove empty spaces between partitions and collect free space at the end of the drive. Such activity could be for the specific purpose of creating sufficient free space to add a new partition of particular size. Alternatively, coalescing is performed during free time in anticipation of a future need for additional free space. As shown in FIG. 3, under any circumstances, including coalescing, a particular set of file data is retrieved according to the following data location computation rules:

Where a current straddle (unused file portion) "S" and a straddle gap size "G", and current file offset "O" are values for an addressing scheme.

If O is less than S, then use the specified O.

If O is greater than S, then Actual O equals Original O plus G.

Thus, if a particular specified file location is located after the straddle S, then the specified offset for the file is increased by the size of the gap created by the straddle within the physical memory containing the file.

With regard to yet another aspect of a preferred embodiment of the invention, the contents of the disk drives in the storage 40 are replicated over multiple drives. Should a read be unavailable from a first drive, the read can continue by accessing one of the other copies. Also, because multiple paths are available to the individual disk drives via the packet classifier and switch 24, the risk of contention for an available bus is significantly lower than single, shared-bus arrangements.

Figure 4:
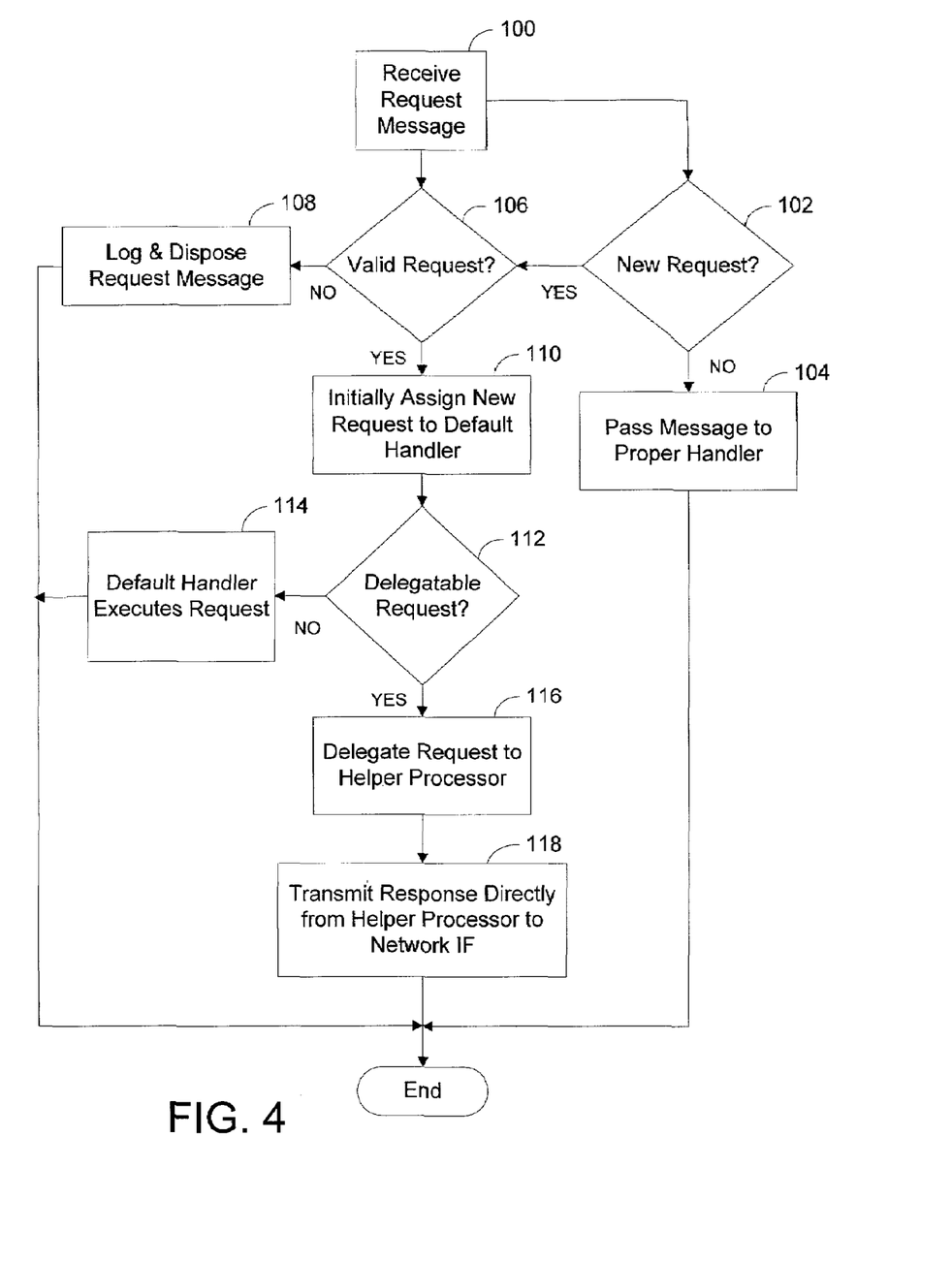
FIG. 4 is a flowchart summarizing the steps performed by a single server card to service a request in accordance with an embodiment of the present invention.

Turning now to FIG. 4, a set of steps are summarized for handling a request message received via the WAN interface 12 from a client. At step 100, after the WAN interface 12 receives a request message packet having an IP address identifying the network processor 10, the message packet is initial passed to the packet classifier and switch 24. Next, at step 102 the packet classifier and switch 24 determines whether the message packet comprises a new request thereby requiring establishing a new IP connection. This is accomplished in the packet classifier and switch 24 by consulting a table listing currently established connections. If the connection specified by the request message packet is in the set of current connections, then control passes to step 104 wherein the request packet is passed to a particular handler processor identified by the connection table and the request packet is processed. Control then passes to the End.

If however at step 102, the request packet requires creating a new connection, then control passes to step 106 wherein the packet classifier and switch 24 applies a filtering criterion to determine whether the received request message is valid. For example, algorithms may be implemented to identify a burst of request messages that appear to be a denial of service attack upon the Web site with which the network processor 10 is associated. If the request message is determined to be invalid, then control passes to step 108 wherein the invalid request message is logged and disposed. Control then passes to the End. It is noted that in an alternative embodiment, the filtering function is performed in later steps, such as after the request message has been assigned to the default network processor 16. In such a case, the default network processor 16 performs the filtering function.

If at step 106 the request is determined to be valid, then control passes to step 110. At step 110 the request is initially assigned to the default network processor 16. At step 112 the default network processor 16 determines, by comparing an embedded command or query within the request message to a table of helper handler processor capabilities and availability, whether the request can be delegated to a helper handler processor on the network processor 10. The available helper handler processors include both the specialized handler processors 26 and the external handler processors. If the request cannot be delegated, then control passes to step 114 wherein the request is processed by the default network processor 16. Control then passes to the End.

If at step 112, the default network processor 16 determines that the received request can be delegated, then control passes to step 116. At step 116 the request is delegated by the default network processor 16 to a particular identified specialized handler processor. In an embodiment a request includes at least an identified connection, and delegating a request includes reassigning the connection to the particular identified handler processor. Thus, in the preferred embodiment of the present invention, when a request is delegated to one of the specialized handler processors, the delegation event, including the connection reassignment is registered within the aforementioned table within the packet classifier and switch 24. Thus, subsequent IP message packets associated with the delegated request are passed directly (without passing through the default handler processor) to the specialized handler processor to which the request was delegated. After delegating the request, control passes to step 118 wherein the specialized handler processor, to which the request was delegated, communicates directly to the requestor on the connection associated with the delegated request without intervention by the default network processor 16. Control then passes to the End.

The above described set of steps for delegating requests from a default handler to a set of available specialized and/or external handlers is intended to be exemplary. For example, while the packet classifier and switch 24 preferably performs a number of traffic control and gatekeeper functions, in alternative embodiments, such activities are delegated to another processor, such as the default processor. It is further noted that while the present embodiment of the invention has been described with regard to IP message packets, the invention is not limited to an IP environment. Rather, the present invention may be implemented in virtually any WAN, LAN or hybrid environment.

Figure 5:
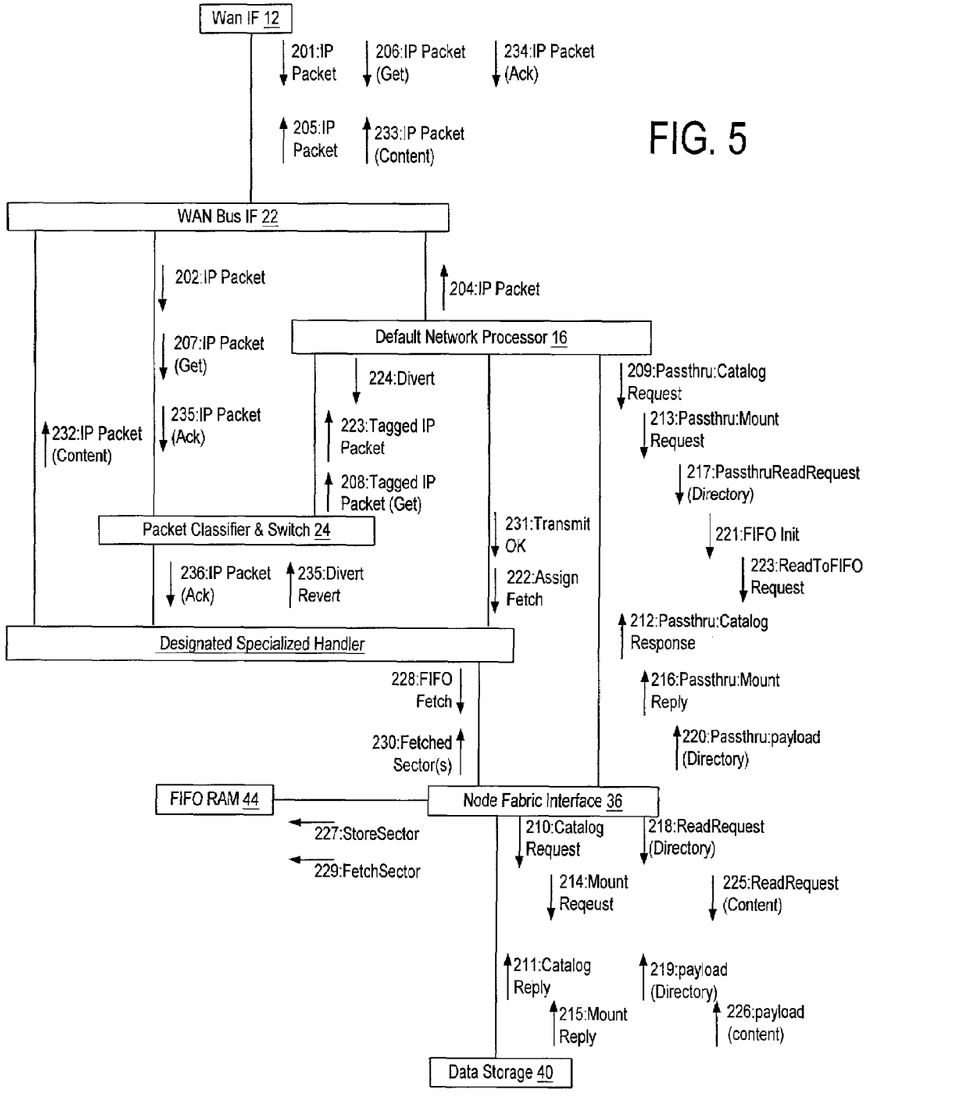
FIG. 5 is a flowchart providing a detailed summary of a set of transactions executed by a network processor in accordance with an embodiment of the present invention.

Turning now to FIG. 5, a detailed set of transactions are summarized in accordance with an embodiment of the present invention. Initially, in response to a user issuing a request over a WAN link, by way of example the Internet, an IP packet associated with a new connection request is received from the WAN IF and passed to the packet classifier and switch 24 during stages 201 and 202. During stages 201 and 202, the IP datagram will be wrapped in Ethernet or ATM depending on the type of WAN IF. Furthermore, method is practicable as long as each packet has a header that explicitly or implicitly identifies the source, destination and purpose of the packet. The Internet Protocol is used for discussion purposes because it is presently the most commonly deployed and is the most widely understood. The I/O operation commenced during stages 201 and 202 will be under the direction of the default network processor 16. The default network processor 16 assigns DMA channels, memory buffers, responds to interrupts, etc. These factors are well known aspects of networking familiar to those skilled in the art.

Next, during stage 203, the packet is classified and then routed to the correct destination. In an embodiment of the present invention, classification is based upon the IP header of a received packet. Specifically, classification depends upon the source IP address, source port, destination address, destination port and whether this datagram initiates a TCP connection. The classification is performed using a criteria of a type generally used by firewall and Virtual Private Network tunnelers. The IP addresses can be masks and the ports can be ranges. Both the source and destination may be used. A series of rules are applied until a match is identified by the packet classifier and switch 24. In the case of a received packet identified as a new session, the received message is tagged as such and routed during stage 203 to the default network processor 16.

Next, during stages 204 and 205, the default network processor 16 acknowledges creation of a new connection to support the new session request. The acknowledgement from the default network processor 16 is a standard TCP connection ack that is used on a normal open. Under most internet protocols exchanging data is initiated by the client, not the server. There are many standard rules in handling TCP connections and packets. These standards adhered to by the default network processor 16 and/or packet classifier and switch 24 are available and familiar to those skilled in the art. Further exchanges to fully setup the session may follow, depending on the specific protocol. For example, a client may be requested to provide a username and password.

Next at stages 206 and 207, WAN Bus IF 12 and packet classifier and switch 24 receive a file request from the client. All the above protocol elements relevant to receiving the first IP datagram apply here as well. Stages 206 and 207 merely represent stages that are farther along in the Internet protocol. However, the WAN IF 12, WAN Bus IF 22, and packet classifier and switch 24 are all unaware of the protocol state.

During stage 208, the packet classifier and switch 24 classifies the new packet and forwards it to the default network processor 16. The packet is now recognized as being part of an existing connection and is tagged as such. It is routed to the default network processor 16 executing the open source server operating system. The classification rules are applied just as before, but the insertion of new rules by the default network processor 16, upon receiving the tagged request from the packet classifier and switch 24, potentially results in a new destination (other than the default network processor 16). In particular, during stage 208, the default network processor 16 determines what file is to be delivered to the requesting client. For this example the network processor has received a simple request, and the desired file can be determined in the initial request. In more complex cases, the default network processor 16 may have to engage in multiple packet exchanges before making this determination. One example, of a more complex request processor concerns HTTP cookies. Such cookies factor into determining exactly what file is to be fetched. For example, as part of an extended request the client's browser may inform the HTTP daemon that it's preferred language is Spanish. Yet another example is one wherein an FTP protocol requires a user to log in before requesting files. Such authentication and associated state management (e.g., login validity duration, file access) remain the responsibility of the default network processor 16. The preferred embodiment seeks to minimize the functionality of the specialized handler processors 26, and thus all of the above set-up procedures are preferably performed by the default network processor 16 rather than one of the minimized capability specialized processors 26.

During stages 209, 210, 211 and 212, the default network processor 16 determines the available content partitions. The passthru capability of the node fabric interface 32 is used to send catalog requests and to receive the response to each. Each catalog request from the default network processor 16 requests the directory information about N more available content partitions. Each response provides an internal ID used to request that partition and a more recognizable external identifier, such as a relevant leftmost portion of a URL.

Next, during stages 213, 214, 215, and 216, the default network processor 16 mounts the selected content partition where the requested file will be found. The passthru capability of the node fabric interface 32 is used to send the mount request to the data storage 40 and to receive a response. The mount request specifies the content partition desired by transmitting an ID obtained from one of the previously received catalog reply messages. A mount reply contains a handle provided by the data storage 40 server that is used in further requests for this session. The mount reply also contains partition attributes that are later used to perform directory lookups.

During stages 217, 218, 219 and 220, the default network server 16 reads the content partition directory to determine the range of sectors where the requested file will be found. The pass through capability of the node fabric interface 32 is again used to send a read request and to receive the payload in response. As explained above, the relative sector of the content partition that is read is based upon hashing the desired filename/URL. The previously supplied partition attributes are constants fed to the hashing algorithm. When the partition's contents were created, these attributes were chosen so that all valid names would hash to a unique location.

Thereafter, during stage 221, the default network processor 16 instructs the FIFO in the node fabric interface 32 to initialize a buffer in the FIFO. A FIFO buffer consists of a header control block (and associated buffers for sectors) stored within the node fabric interface's SDRAM 44. The header control block specifies the base address of the sector buffers, the maximum number of sector buffers, the offset of the next sector to be written, the offset of the next sector to be read and the number of sectors present. The default network processor 16 is responsible for allocating the FIFO header control blocks in a consistent fashion (e.g., no overlapping of buffers, etc.).

Alternatively, the default network processor may elect to have the payload delivered directly to it's FIFO buffer's via the PCI interface. The provided FIFO control block specifies target addresses over the PCI bus. Selection of a method is a matter that the default network processor is free to vary by software revision and/or even specific requests. For example, it may allow a fixed amount of the PCI bandwidth to be consumed by direct transfers before electing to use the fabric interface's DRAM. Conversely it could allocate the fabric interface's DRAM first, and only use immediate transfers when that resource is overburdened.

At stage 222, in accordance with an aspect of the present invention, the default network processor 16 assigns one of the specialized handler processors 26 to TCP wrap the content supplied by the data store 40 pursuant to the client request. The connection to be serviced, the FIFO buffer data to be fetched and the total number of bytes is specified. Next, during stage 223, the node fabric interface 32 is instructed to read a range of sectors using a supplied handle onto a specified FIFO buffer. Both the handle and FIFO buffer must pre-exist. When fetching from optimized file systems, a single command is issued. With more complex file systems, multiple fetches are generally required. In cases requiring multiple fetches control reverts from the assigned one of the specialized handler processors 26 to the default network processor 16 after reading each contiguous portion of the desired file. While workable, such file request procedures are certainly less desirable.

During stage 224 that follows, the default network processor 16 instructs the packet classifier and switch 24 to divert the newly established connection to the selected one of the set of specialized handler processors 26. In particular, the packet classifier and switch 24 is provided rules to insert into a list of classification/forwarding rules for directing received packets to a proper destination. During stages 225 and 226, the node fabric interface 32 issues reads to the data storage 40 whenever it has room within the assigned FIFO buffer in the RAM 44 until all the requested data has been received from the data storage 40. Only one outstanding read can be issued per FIFO buffer, and each FIFO buffer must have a different handle to enable the node fabric interface 32 to distinguish data received from the data storage 40 in response to one of a set of outstanding data requests. Only one read is issued per client identifier to the data storage 40. In the preferred implementation this is a single byte, which may be used by the fabric interface to uniquely specify an input buffer by any mapping desired. This mapping will be directed to a specific target FIFO buffer. Each request complies with other restrictions of any network associated with the data storage 40. For the illustrative storage system each request must have a request ID that is unique amongst all current or recent requests issued by the node fabric interface 32. For most fabrics, the request must identify the return address of the Interface.

During stage 227, as sectors are fetched from the data storage 40 via the switching fabric 38, they are stored in FIFO buffers implemented in the node fabric interface 32's FIFO buffers in the SDRAM 44. Such buffered retrievals accommodate the bursty nature of data retrieval from data storage 40. In an embodiment of the invention where data traffic primarily involves reading data from data storage 40, the SDRAM 44 need only be used for temporarily storing data retrieved from the data storage 40 via the node fabric interface 32. This avoids using multiple or more costly high speed memory devices. In the preferred implementation the node fabric interface 32 delivers 16 bits of data at a 40 MHz rate. If the memory devices are 16 bit wide (to minimize pin usage) and run at 100 MHz, then the traffic consumes 80% of the memory bandwidth. Another example is a 50 MHz fabric, with memory running at 120 MHz or faster. The memory devices must be running at more than twice the bandwidth of the fabric interface.

During stage 228 the designated one of the specialized handler processors 26 requests it's initial data. This request specifies a previously assigned FIFO buffer. If this FIFO Buffer is on the network processor's DRAM then it may just simply be used. Associated status flags must be cleared when it is free to be re-used. Otherwise it must be fetched from the node fabric interface 32. Next, at stage 229, the request is fulfilled from the FIFO specific storage in the SDRAM 44. If there is no data in the identified FIFO buffer, the request is held until data is available before proceeding with this request. The node fabric interface 32 manages multiple FIFO buffers in parallel. At stage 330 the node fabric interface 32 delivers sectors stored in the FIFO SDRAM 44, via the dual ported RAM 45, to the designated one of the specialized handler processors 24. This is normally when requested, but can also be when new data is stored.

At stage 331, the designated one of the specialized handler processors 26 wraps the received data from the dual ported RAM 45 for TCP transmission via the WAN Bus interface 22. The designated handler processor then waits for permission (e.g., TransmitOK) by the default network processor 16 to transmit the wrapped data to the WAN IF 22 during stage 232. The WAN Bus interface 22 sends the TCP wrapped data to the client via the NP IXBusWAN Interface Bus during stage 233. Normal wrapping of file contents within TCP packets apply.

During stage 234 the client transmits an acknowledgement (requesting the next block of data). The WAN IF 22 routes the received acknowledgement/request to the packet classifier and switch 24 during stage 235. However, rather than routing this request to the default network processor 16, the packet classifier and switch 24 directs the ack/request to the designated one of the set of specialized handler processors 26 during stage 236. The designated handler processor fetches more data in accordance with stages 228, 229 and 230; and the FIFO will continue to refill itself as described herein above according to stages 225, 226, and 227. The received data is, in accordance with an exemplary embodiment, TCP wrapped by the designated handler processor and transmitted to the requesting client according to stages 231, 232 and 233.

Eventually the entire file has been fetched and transmitted to the requesting client from the network processor 10. When the data transfer is complete the designated one of the specialized handler processors 26 informs the packet classifier and switch 24 during stage 237, and a next request on the session/connection will be delivered by the packet classifier and switch 24 to the default network processor 16.

Finally, the present set of stages represents the normal operation of the network processor 10. One of the primary goals in an embodiment of the present invention is to keep the specialized handler processors as simple as possible (i.e., handle a narrow set of tasks). Thus unexpected events, such as excessive timeouts or messages other than a simple ACK, will also result in reverting the connection to the default network processor 16.

Illustrative embodiments of the present invention and certain variations thereof have been provided in the Figures and accompanying written description. The present invention is not intended to be limited to these embodiments. Rather the present invention is intended to cover the disclosed embodiments as well as others falling within the scope and spirit of the invention to the fullest extent permitted in view of this disclosure and the inventions defined by the claims appended herein below.

What is claimed is:

1. A distributed multiprocessor server system for facilitating delegated processing of at least portions of requests associated with request messages received via a communicatively coupled network link, the system comprising:
    a network interface;
    an intelligent switch coupled to the network interface, the switch comprising logic components for identifying a new request, corresponding to a message packet received by the network interface, passed from the network interface to the intelligent switch;
    a default handler processor coupled to the intelligent switch and configured to receive the new request from the intelligent switch, the default handler processor comprising delegation logic facilitating; associating a request type with at least a portion of the new request, identifying a handler processor from a set of specialized handler processors for executing at least the portion of the new request based upon the request type, and issuing a message reassigning at least the portion of the new request to the identified handler processor; and
    at least one bus structure communicatively linking the set of specialized handler processors to the intelligent switch and request reassignment tracking logic enabling the intelligent switch to route messages associated with at least the portion of the reassigned request between the identified handler processor and the network interface, thereby facilitating completing at least the portion of the new request through communications between the identified handler of specialized handler processors and the network interface via the intelligent switch without intervention by the default handler processor.

2. The distributed multiprocessor server system of claim 1 further comprising a storage server system linked to the intelligent switch via a non-blocking switch.

3. The distributed multiprocessor server system of claim 2 wherein the storage server system comprises memory arranged as a set of version controlled partitions.

4. The distributed multiprocessor server system of claim 3 wherein a straddle is incorporated into a partition, thereby facilitating continuous availability of all stored data while a particular partition is relocated within the storage server system.

5. The distributed multiprocessor server system of claim 2 wherein a state of a file maintained by the storage server system is represented in the form of a bitmap entry; and wherein a first bit is associated with a creator of new data in the file and a second bit is associated with a deleter of data stored in the file.

6. The distributed multiprocessor server system of claim 2 wherein the intelligent switch receives messages from the non-blocking switch in the form of ATM cells.

7. The distributed multiprocessor server system of claim 2 wherein the set of specialized handler processors includes a processor facilitating transfer of a file stored on the storage server system.

8. The distributed multiprocessor server system of claim 7 wherein the file transfer is performed in accordance with a TCP named file transfer protocol over an identified connection.

9. The distributed multiprocessor server system of claim 2 wherein the set of specialized handler processors includes a processor including functionality facilitating transforming the data within a file prior to transfer.

10. The distributed multiprocessor server system of claim 1 wherein the set of specialized handler processors includes a processor including computer gateway interface (CGI) functionality.

11. The distributed multiprocessor server system of claim 1 further comprising a data retrieval buffer interposed between a data storage facility and the set of specialized handler processors, the data retrieval buffer being independently accessible with respect to a primary RAM utilized by the default handler processor.

12. The distributed multiprocessor server system of claim 1 further comprising new/old request differentiation logic enabling the server system to identify and respond to new connection requests at a different level of priority than a priority assigned to requests associated with existing connections.

13. A method for allocating received requests in a multiprocessor network server including a network interface, an intelligent switch, a default handler processor, and a set of specialized handler processors, the method comprising the steps of:

receiving, by the network interface, a message packet including a request;

passing at least the request to the intelligent switch;

determining the request is a new request, and in response performing the further steps of:

identifying by the default handler processor, based upon a request type of the new request a handler processor from the set of specialized handler processors that is capable of executing at least a portion of the new request, and reassigning by the default handler processor, the new request to the identified handler processor to perform at least a portion of the new request, wherein the intelligent switch creates a request table entry identifying the request and the identified handler processor to which at least a portion of the new request is reassigned; and executing, by the identified handler processor, at least the portion of the new request, wherein during the executing step the identified handler processor communicates with the network interface via the intelligent switch; thereby bypassing the default handler processor while executing at least the portion of the new request.

14. The method of claim 13 wherein a storage server system is linked to the intelligent switch via a non-blocking switch, and the executing step comprises transferring data from the storage server to the network interface.

15. The method of claim 14 further comprising arranging stored content within the storage server system as a set of version controlled partitions.

16. The method of claim 15 further comprising incorporating a straddle into a partition, thereby facilitating continuous availability of all stored data while a particular partition is relocated within the storage server system.

17. The method of claim 14 further comprising maintaining, by the storage server system, a state of a file in the form of a bitmap entry; and wherein a first bit is associated with a creator of new data in the file and a second bit is associated with a deleter of data stored in the file.

18. The method of claim 14 further comprising receiving, by the intelligent switch, a message from the non-blocking switch in the form of ATM cells.

19. The method of claim 14 further comprising providing, within the set of specialized handler processors, a processor facilitating transfer of a file stored on the storage server system.

20. The method of claim 19 wherein the processor facilitating transfer of a file operates in accordance with a TCP named file transfer protocol over an identified connection.

21. The method of claim 14 further comprising providing, within the set of specialized handler processors, a processor including functionality facilitating transforming the data within a file prior to transfer.

22. The method of claim 13 further comprising providing, within the set of specialized handler processors, a processor including computer gateway interface (CGI) functionality.

23. The method of claim 13 further comprising storing data retrieved from a data storage facility in a data retrieval buffer interposed between a data storage facility and the set of specialized handler processors, the data retrieval buffer being independently accessible with respect to a primary RAM utilized by the default handler processor.

24. The method of claim 13 further comprising differentiating a new connection request from a request associated with an existing connection, thereby facilitating assigning a first priority to the request associated with the existing connection and a second priority to the new connection request.

* * * * *